UNITED STATES PATENT OFFICE.

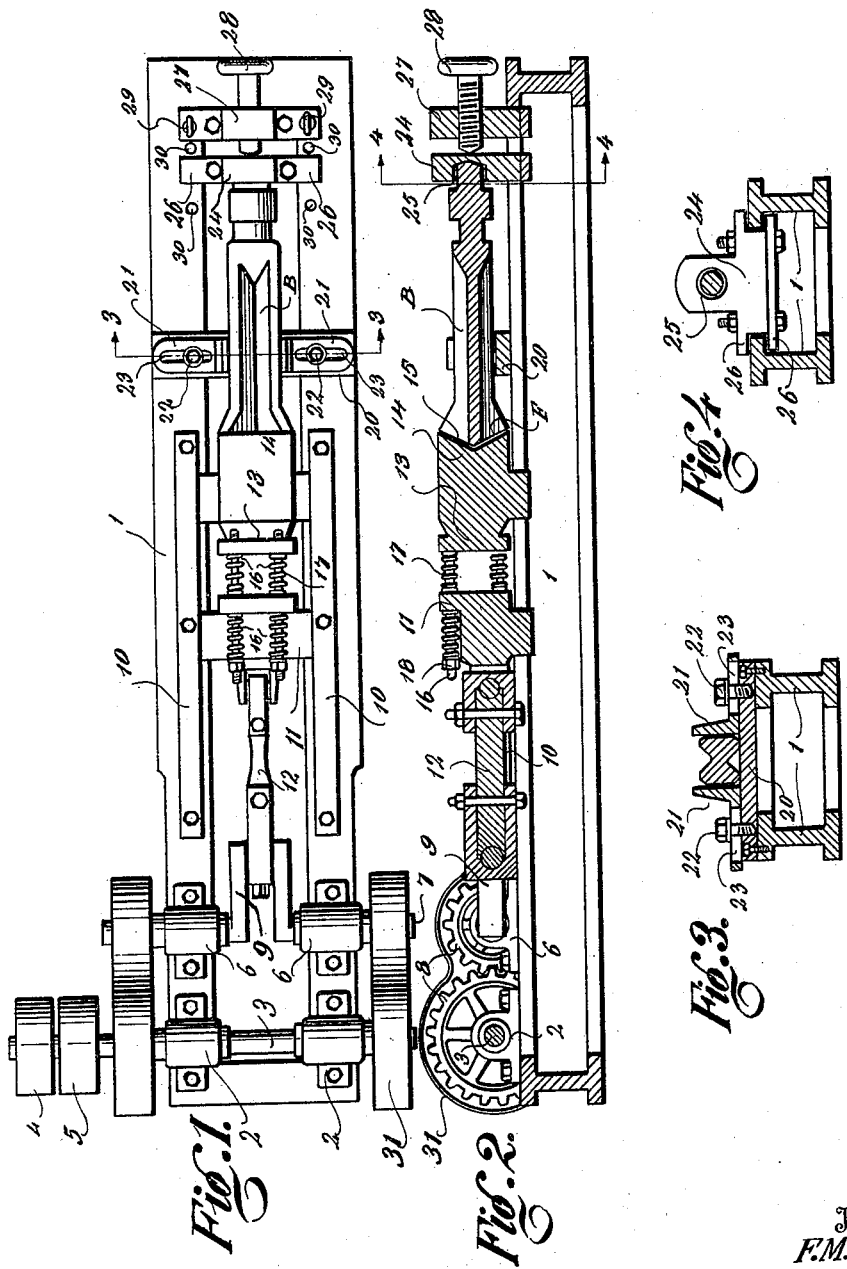

FORREST M. LEE, OF GENEVA, INDIANA.

BIT-DRESSING MACHINE.

1,407,286. Specification of Letters Patent. Patented Feb. 21, 1922.

Application filed August 2, 1920. Serial No. 400,753.

*To all whom it may concern:*

Be it known that I, FORREST M. LEE, a citizen of the United States, residing at Geneva, in the county of Adams, State of Indiana, have invented certain new and useful Improvements in Bit-Dressing Machines; and I do hereby declare the following to be a full, clear, and exact description of the invention, such as will enable others skilled in the art to which it appertains to make and use the same.

This invention relates to the making of metal tools, and more especially to machines for forming and sharpening drills; and the object of the same is to produce a machine of this kind intended for shaping the cutting ends of bits which are used in drilling wells. These bits are about six feet long with a cutting face of from ten to twenty inches, and a large bit will often weigh nearly a ton. Their cutting faces soon become jammed and misshapen, especially when drilling in rock or stone, and the drill must then be withdrawn from the casing and reshaped or sharpened. Manifestly time is saved if the worn drill is replaced by a new one so that the drilling operation is not interrupted, and the purpose of the present invention is to produce a machine for quickly dressing drills of various lengths, as they are brought to it from the several wells of a group.

One practical embodiment of the invention is set forth below and shown in the drawings wherein:

Figure 1 is a plan view, Figure 2 a longitudinal section, Figure 3 a cross section on the line 3—3 of Figure 1, and Figure 4 is a section on the line 4—4 thereof.

The numeral 1 designates broadly a rectangular framework having near one end a pair of bearings 2 for a main shaft 3 carrying fast and loose pulleys 4 and 5 as shown and to which power may be applied by a belt not shown and capable of being shifted from one pulley to another by a belt shifter also not shown. Mounted in other bearings 6 on the framework is a crank shaft 7 connected by gearing 8 with the main shaft, the ratio of gearing and the application of power being such that the crank shaft will make about seventy-five revolutions a minute. I find that it is advantageous to have the crank 9 in a shaft separate from the main shaft and rotated at a different speed. The blows imparted by the hammer create jar which is communicated to the crank shaft and its bearings rather than to the main shaft and its bearings, leaving it possible to replace or repair the former without touching the latter. Again, if the shafts rotate at different speeds the jar occasioned by each blow of the hammer is not always imparted to the main shaft at the same point in its revolution, which might unduly wear the driving belt. There are other considerations, but these will be sufficient.

Mounted in guides 10 along the framework is a cross head 11 connected by a pitman 12 with the crank 9. Mounted in the same guides is a second cross head 13 carrying a hammer 14 whose face 15 is shaped to conform with the configuration which it is desired to give the cutting edge or face F of the bit B. From the cross head 13 a number of bolts 16 extend outward through eyes in the cross head 11, and stout coiled springs 17 are disposed between the cross heads and on said bolts beyond the outer cross head and inside of nuts 18 upon the bolts. Therefore the rapid revolution of the crank shaft results in reciprocations of the hammer 14 whose blows are to an extent cushioned to the cross head 11 by the springs.

On a cross bar 20 upon the framework are mounted two knees 21 as best seen in Figure 3, screws 22 extending through slots 23 in the knees for holding them adjustable on the cross bar, and between the upturned inner ends of the knees is mounted the body of the bit B. Further outward upon the framework is slidably mounted a second work holder as best seen in Figure 4. This consists of a block 24 having a socket 25 in its face for the threaded end of the bit-shank, and jaws 26 slidably engaging the side bars of the framework. Yet outside this work holder is a second block 27 substantially like that just described, excepting that it has a set screw 28 adjustably mounted through its upper end behind or outside of the first block directly behind the socket in the latter. This second block may also have set screws 29 engaging selected holes 30 disposed in series along the side bars of the framework.

In the use of this machine the blocks are adjusted in proportion to the length of the bit, the extremity of its shank is inserted in the socket 25, and its body is disposed between the knees 21 with its cutting edge or face F toward the hammer 14. Power is now applied to the fast pulley and the main shaft drives the crank shaft so that the hammer begins its reciprocations. Now by setting up the set screw 28 through the outer block, the inner block is advanced slowly and it moves the bit B inward, sliding it over the cross bar 20 and between the knees 21 thereon. Eventually the face F comes within reach of the hammer 14 at the extreme of each stroke of the latter, and the most pronounced distortions of the face are acted upon first. Subsequent advance of the bit results in the gradual swaging and dressing of its face, so that it is rapidly shaped and sharpened, perhaps to such a degree that it is unnecessary even to finish it with other tools before restoring it to use. Manifestly the active face of the hammer must be shaped to produce this result as rapidly as possible and with the least wear to the hammer, although from time to time it will be necessary to replace the hammer with a new one. As suggested above, the jar created by the rapid blows of the heavy hammer on the bit, is cushioned to the cross head 11 and pitman and crank shaft, with the result that the driving mechanism will last a long time. To replace the hammer the nuts are run off the rear ends of the bolts which connect the two cross heads, and the bolts drawn out of the rear cross head and springs, and another hammer with appropriate bolts substituted in a manner which will be clear. A single bit dressing machine of this type would be sufficient to treat the bits of quite a group of wells, provided each drill rig is supplied with two or three bits so that a fresh one may be kept constantly at work.

The machine is thus described in its simplest form. We prefer to provide guides over the gearing, as indicated in outline at 31, and there will be a block and tackle or a conveyer or other mechanism by which heavy bits can be put into place and removed. Of course the machine is not confined to the shaping of bits as specifically set forth, but if it is employed for other work the face of the hammer will be modified to correspond.

What is claimed is:

1. In a bit dressing machine, the combination with a framework, and means on one end thereof for adjustably supporting the work; of a power shaft journaled across the other end of the framework, a crank shaft mounted adjacent thereto, gearing connecting said shafts to cause their rotation at different speeds, a cross head slidably mounted on the framework, a pitman connecting it with the crank shaft, a second cross head mounted on the framework forward of the first, bolts projecting from this cross head through openings in the first, springs on the bolts at opposite sides of the first cross head, and a hammer carried by the second cross head.

2. In a bit dressing machine, the combination with a framework, a hammer mounted on one end thereof, and means for reciprocating it; of a bar across the other end of the framework, knees on said bar adjustable toward and from each other, two blocks slidably mounted on the framework beyond said bar, the inner block having a socket for the end of the bit-shank, and a set screw through the outer block against the inner.

3. In a bit dressing machine, the combination with a framework, a hammer mounted on one end thereof, and means for reciprocating it; of a bar across the other end of the framework, knees on said bar adjustable toward and from each other, two blocks slidably mounted on the framework beyond said bar, means on the inner block for engaging the bit-shank, a set screw through the outer block against the inner, and means for setting the outer block at various positions along the framework.

In testimony whereof, I affix my signature, in the presence of two witnesses.

FORREST M. LEE.

Witnesses:
CLIFFORD KING,
J. D. BRIGGS.